United States Patent [19]

May

[11] Patent Number: 5,357,258

[45] Date of Patent: Oct. 18, 1994

[54] ARRANGEMENT FOR CONVERTING A PLAN POSITION INDICATOR RADAR DISPLAY TO A SCALED PERSPECTIVE DISPLAY

[75] Inventor: Reed R. May, Boca Raton, Fla.

[73] Assignee: AlliedSignal Inc., Morris Township, Morris County, N.J.

[21] Appl. No.: 157,252

[22] Filed: Nov. 26, 1993

[51] Int. Cl.5 .............................................. G01S 7/512
[52] U.S. Cl. .................................................... 342/185
[58] Field of Search ........................ 342/185, 176, 179

[56] References Cited

U.S. PATENT DOCUMENTS

| | | | |
|---|---|---|---|
| 3,739,385 | 6/1973 | Bechtel et al. | 343/705 |
| 3,866,222 | 2/1975 | Young | 342/185 |
| 3,988,731 | 10/1976 | Young | 342/179 |

Primary Examiner—John B. Sotomayor
Attorney, Agent, or Firm—Howard G. Massung

[57] ABSTRACT

A plan position indicator display is converted to a correctly scaled perspective display based on aircraft altitude and display parameters. Two cartesian based display memories are involved. One memory stores the plan position indicator image to be converted and the other memory stores the converted image ready for direct display on a bit-mapped display device. The arrangement is such that a plan position indicator display pixel address is provided for each pixel in the memory which stores the converted image for permitting said latter memory to be completely filled with the most appropriate pixel values at the frame rate without the need for further pixel filling or erasing.

14 Claims, 3 Drawing Sheets

FIG. 1

```
Frame:
    Ky = (Vd*Yo*H)/(hd*Sys)
    Kxf = II/(Sar*Sxs)
    Ylim = Ky/Ys
    if (Ylim > Yo) Ylim = Yo
    Yoa = 0
    while (Yoa <= Ylim)
      {X_count = 0
        while (X_count < Xo/2)
          {Xoa = Xo/2 + X_count
           target(Xoa,Yoa) = black
           Xoa = not(X_count)
           target(Xoa,Yoa) = black
           X_count = X_count + 1
          }
        Yoa = Yoa + 1
      }
    Xlim = Xo/2

Line:
while (Yoa < Yo)
  {Ysa = Ys - (Ky/Yoa)
   Kxl = Kxf/Yoa
   If (Xlim < Xo) then
      {Xlim = Xs/(2*Kxl) + Xo/2
       if (Xlim > Xo) then Xlim = Xo
      }
   Xsa(+) = Xs/2
   Xsa(-) = Xs/2
   X_count = 0

Pixel:
while (X_count < Xlim)
  {Xoa = Xo/2 + X_count
   target(Xoa,Yoa) = source(Xsa(+),Ysa)
   Xoa = not(X_count)
   target(Xoa,Yoa) = source(Xsa(-),Ysa)
   X_count = X_count + 1
   Xsa(+) = Xsa(+) + Kxl
   Xsa(-) = Xsa(-) - Kxl
  }
while (X_count < Xo/2)
  {Xoa = Xo/2 + X_count
   target(Xoa,Yoa) = black
   Xoa = not(X_count)
   target(Xoa(-),Yoa) = black
   X_count = X_count + 1
  }
Yoa = Yoa + 1
}
```

ARRANGEMENT FOR CONVERTING A PLAN POSITION INDICATOR RADAR DISPLAY TO A SCALED PERSPECTIVE DISPLAY

BACKGROUND OF THE INVENTION

Landing an aircraft in zero-zero conditions requires, in effect, seeing through fog and rain. While there has not heretofore been a viable way to accomplish this, systems are being developed which take advantage of the latest advances in electronic imagery to make the aforementioned a reality.

One such system is designated as Synthetic Vision and incorporates an electronic image derived at least in the millimeter-wave frequency range, and in the infrared frequency range if necessary, and presents the image to a pilot in a head-up or head-down display. Such an arrangement will enable the pilot to effectively see through precipitation, particularly fog, for achieving safe day or night landings under zero-zero conditions. The background and history of the Synthetic Vision concept is described in an article entitled "Synthetic Vision Will Let Pilots See through Precip" by C. V. Glines and published in the August, 1990 issue of *Professional Pilot*.

A system of the type described requires an arrangement wherein a plan position indicator (PPI) cartesian map radar display is converted to a correctly scaled perspective display based on aircraft altitude, physical display dimensions and the viewing distance to a display screen.

The present applicant is aware of the following patents directed generally to perspective radar displays, all of which patents were issued to David W. Young and are classified in U.S. Class 343/5 LS: U.S. Pat. No. 3,866,218 which issued on Feb. 11, 1975; U.S. Pat. No. 3,866,222 which issued on Feb. 11, 1975; U.S. Pat. No. 3,896,432 which issued on Jul. 22, 1975; and U.S. Pat. No. 3,988,731 which issued on Oct. 26, 1976.

U.S. Pat. No. 3,866,218 relates to an arrangement wherein the horizontal position of echo signals displayed on a display screen are repositioned by operating adjusting means to shift the phase of a cyclic wave form by an amount to correct any phase shift between the output of a beam position sensor means and an actual azimuth position of the beam as a consequence of errors occurring in conversion by the beam position sensor means of the actual azimuth position of the beam and the generation of the cyclic wave form representing the actual position. The invention may advantageously be used with a perspective radar system wherein the generated beam is fan shaped in a vertical plane, but is acknowledged as being applicable to any scanning system wherein the beam is scanned back and forth through a given sector.

U.S. Pat. No. 3,866,222 relates to an arrangement for providing a perspective radar display on a radar cathode ray tube wherein a linear sweep is used so that the brightness of the picture is uniform throughout and the size of the display is not limited. Moreover, because the cathode ray tube includes a conventional linear sweep, it is adaptable for use with other input information normally requiring a linear sweep, as is the case in, for example, television.

U.S. Pat. No. 3,896,432 relates to a perspective radar system and a guidance control arrangement incorporating known information relative to an airport complex, including the range and heading of an aircraft to the airport runway from a given fixed point of the aircraft for comparisons with the perspective display provided by the perspective radar system.

U.S. Pat. No. 3,988,731 relates to altering a display provided by a perspective radar system to provide a display in perspective as would appear if the observer were at a different position from his actual position. The different position may be in altitude, in range, or a combination of both.

The present invention features providing a correctly scaled and registered perspective image in real-time, based on known constants and airframe supplied altitude data using exact derivations and no approximations. The arrangement disclosed completely refreshes all pixels in a display memory so that "fill" or "cleanup" operations are not needed. There are no Moire patterns due to partial fill.

Iterative implementation minimizes computational requirements. Divide operations are only required at the line rate and not the pixel rate for simplification purposes. Simple equations allow the use of a minimum number of common components and all out-of-range conditions are handled efficiently with data blanking provided when needed.

The above features of the invention which are seen to distinguish over the prior art noted above will be readily discerned from the detailed description of the invention which follows.

SUMMARY OF THE INVENTION

This invention contemplates an arrangement for converting a plan position indicator (PPI) radar display to a scaled perspective display which features the real time transformation from the PPI cartesian map radar display to the perspective display with speed and efficiency. The speed and efficiency are derived from three basic features of the invention: (1) the conversion is implemented in reverse form which eliminates wasted computations on non-visible source pixels and provides 100 percent efficiency in filling a display memory; (2) the equations that are implemented are reduced to incremental form which reduces high speed computational requirements; (3) the conversion starts at the top center of an output memory and moves outward and downward which allows all out-of-range conditions to be detected efficiently and handled correctly; and (4) when all control parameters are supplied correctly the resulting presentation is properly registered and scaled in relationship to the "real world" objects in the presentation.

Accordingly, this invention contemplates an arrangement for converting first memory means for storing plan position indicator image data, second memory means, converting means connected to the first memory means and to the second memory means for converting the stored plan position indicator image data to perspective display image data, and for transferring the perspective display image data to the second memory means, whereby said perspective display image data is stored in the second memory means ready for direct display on a bit-mapped display means, and means for addressing the first memory means for each pixel of the data stored in the second memory means, whereby the second memory means is completely filled with the most appropriate pixel values at a frame rate for eliminating further pixel filling and erasing.

BRIEF DESCRIPTION OF THE DRAWINGS

FIG. 1 is a pseudocode description of a control sequence according to the invention.

DETAILED DESCRIPTION OF THE INVENTION

The following equation definitions are applicable to the description of the invention.

$$Ysa = Ys \frac{Ky}{Yoa}, \text{ where:} \quad (1)$$

Ysa = Physical y axis address in source memory (pixels)
Ys = y axis dimension of source memory (pixels)
Yoa = Physical y axis address in target memory (pixels)
Ky = Conversion value computed at any required rate.

$$Ky = \frac{(Vd)(Yo)(H)}{(hd)(Sys)}, \text{ where:} \quad (2)$$

Vd = Viewing distance from eye to screen (feet)
Yo = y axis dimension of target memory (pixels)
H = aircraft altitude (feet)
hd = height of the display screen (feet)
Sys = Scaling constant for the y axis of source memory (feet/pixel).

$$Xsa = \frac{Xs}{2} + \frac{(Xoa - Xo/2)H}{(Sar)(Yoa)(Sxs)}, \text{ where:} \quad (3)$$

Xsa = physical x axis address in source memory (pixels)
Xs = x axis dimension of source memory (pixels)
Xoa = physical x axis address in target memory (pixels)
H = aircraft altitude (feet)
SSTs = Scaling constant for the x axis of source memory (feet/pixel)
Yoa = physical y axis address in target memory (pixels)
Sar = aspect ratio of target memory pixels
Xo = x axis dimension of target memory (pixels).
Definition of Sar:
Ypix = (output screen width)/Yo
Xpix = (output screen height)/Xo $$Sar = \frac{Xpix}{Ypix} \quad (4)$$

Equation (4) assumes that all the memory is mapped to a display screen. If this is not the case then the appropriate fraction of Xo and Yo are to be used.

The following computational summary is applicable to the disclosed invention.

At frame rate:

$$Ky = \frac{(Vd)(Yo)(H)}{(hd)(Sys)};$$

$$Kxf = H/(Sar*Sxs); \text{ and}$$

$$Ylim = Ky/Ys.$$

Typically, these computations are performed by a host microprocessor since the execution rate would typically be low. The results would then be loaded into registers for use in transform hardware.

At line rate:
Ysa = Ys − (Ky/Yoa)
Kxl = Kxf/Yoa
Xlim = Xs/(2*Kxl) + Xo/2)
Xsa(+) = Xs/2
Xsa(−) = Xs/2

At pixel rate:
Xsa(+) = Xsa + Kxl
Xsa = Xsa − Kxl

Note: The x axis addresses are symmetric about Xs/2.

The line rate and pixel rate computations are performed in specialized hardware because of the execution speeds required as will be appreciated by those skilled in the art. If one or more DSP (digital signal processing) devices is used, all of the computations can be done in software inside the DSP(s). The pseudocode illustrated in FIG. 1 describes the overall control flow needed to realize the described transformation.

Figure 2:
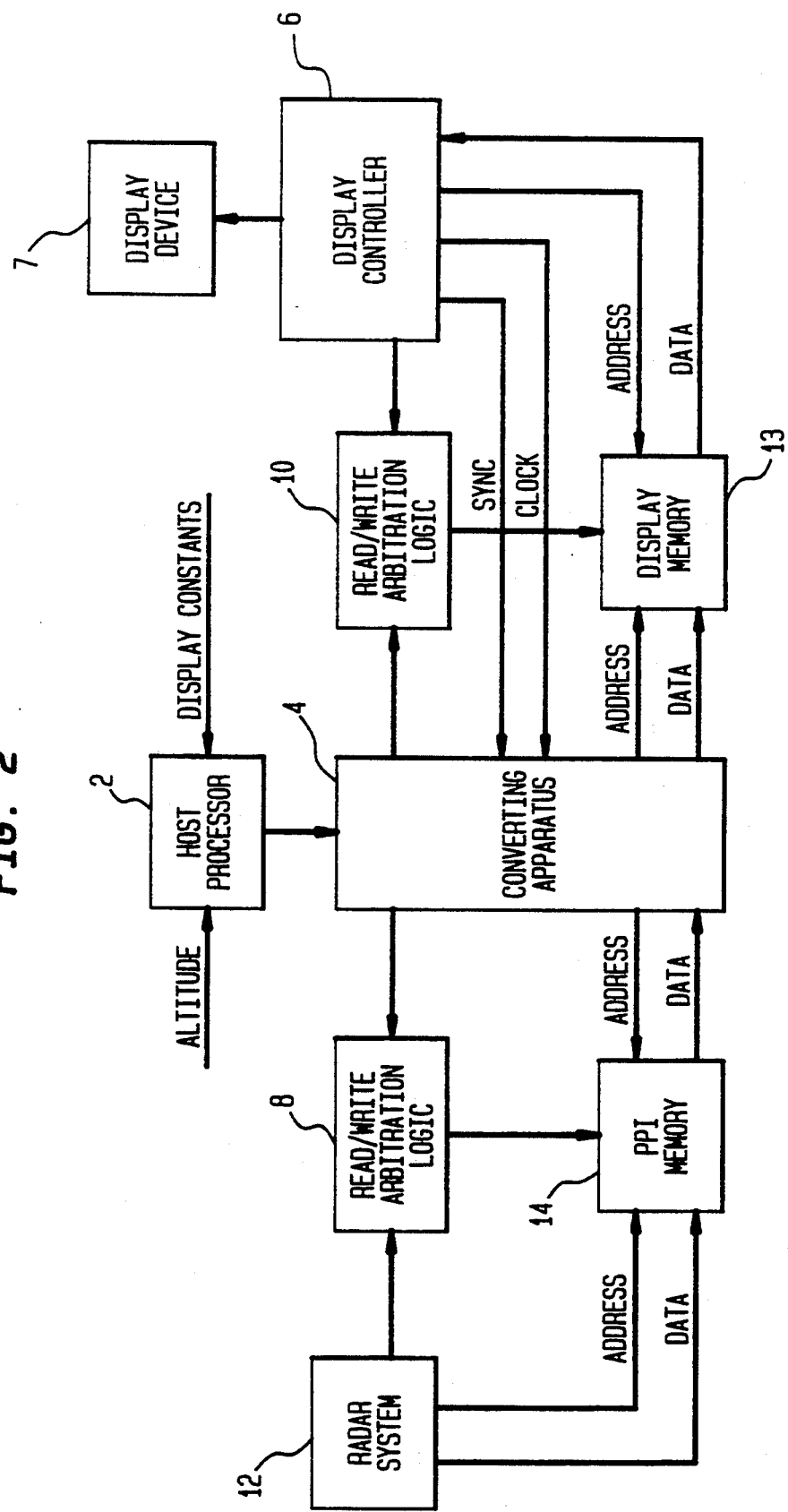
FIG. 2 is a block diagram generally illustrating a system incorporating the invention.

With the aforegoing equation definitions, computational summary and the pseudocode illustrated in FIG. 1 in mind, reference is now made to FIG. 2 wherein a host processor is designated by the numeral 2, and which host processor may be a digital signal processing device which is responsive to an aircraft altitude input for driving perspective transform hardware 4.

A display controller 6 applies control signals to a display device 7 and applies synchronizing (horizontal and vertical) and clock signals to converting apparatus 4. Converting apparatus 4 applies signals to read/write arbitration logic 8 and to read/write arbitration logic 10. Display device 7 may be a bit mapped display device such as, for example, a cathode ray tube (CRT) or a liquid crystal display (LCD).

Display controller 6 applies signals to read/write arbitration logic 10 and a radar system 12 applies signals to read/write arbitration logic 8.

Read/write arbitration logic 10 applies read/write logic signals to a memory 13 which receives address and data signals from display controller 6 and applies data signals to the video controller. Display memory 13 stores perspective display data.

Radar system 12 applies address and data signals to a memory 14. Memory 14 stores plan position indicator (PPI) data. Memory 14 receives read/write logic signals from read/write arbitration logic 8. PPI memory 14 receives address signals from converting apparatus 4 and applies data signals to said converting apparatus. Converting apparatus 4 applies address and data signals to display memory 13. The arrangement is such that the address signals from converting apparatus 4 applied to PPI memory 14 and to perspective display memory 13 effect a pixel address for each pixel in the display memory.

Figure 3:
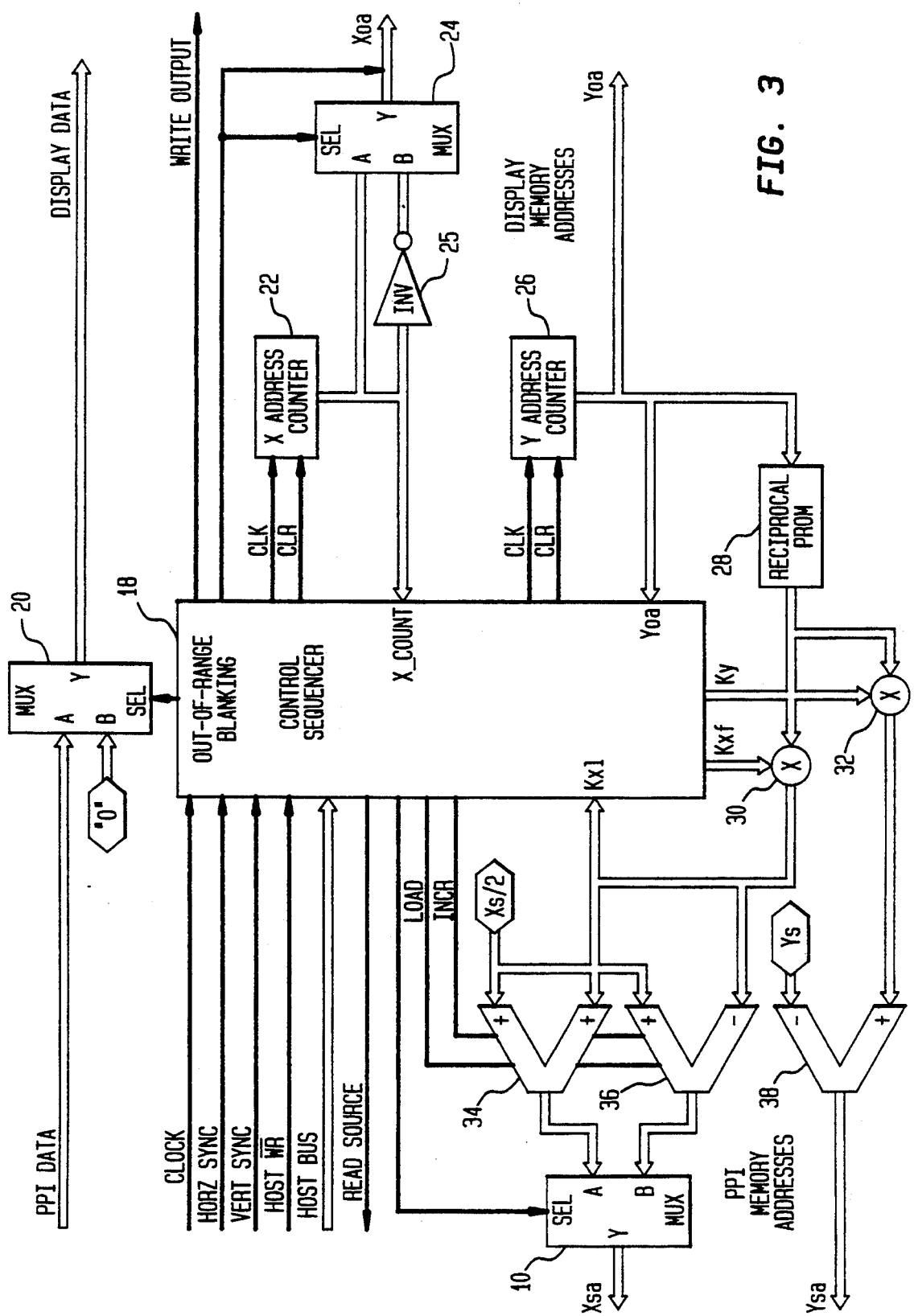
FIG. 3 is a block diagram particularly illustrating converting apparatus shown generally in FIG. 1.

Converting apparatus 4 shown generally in FIG. 2 is more particularly shown in FIG. 3, wherein the several applied and received signals are more specifically illustrated, as are the several components of converting apparatus 4. Converting apparatus 4 includes a control sequencer 18, an output data multiplexer 20, an X address counter 22, an output memory/X address multiplexer 24, an output memory/Y address counter 26, a reciprocal programmable read only memory (PROM) 28, multipliers 30 and 32, an adder 34, subtractors 36 and 38, and a source memory/X address multiplexer 40.

Control sequencer 18 is a finite state machine type controller for performing the computational elements implementing the transform operation of the invention as defined in the aforegoing computational summary and as illustrated in FIG. 3. Control sequencer 18 synchronizes the operation of these computational elements to the rest of the system and provides an interface to host processor 2. Control sequencer 18 also contains latches for holding constants computed by the host processor and used by the hardware of the invention such as, for example Ylim, Ky, and Kxf. The control sequencer also holds system constants such as Yo and Xo. These values are tested against the generated addresses to control multiplexer 20.

The pseudocode description illustrated in FIG. 1 illustrates what control sequencer 18 must accomplish. In summary, control sequencer 18 is responsible for all tasks done at the line and pixel rates. In this regard, it is noted that control sequencer 18 can be implemented with a single digital processor (DSP) built from conventional components to satisfy the requirements of the invention.

Multiplexer 20 is used to switch in "0" values to blank data in display memory 13 when no mappable data exists in PPI memory 14.

X address counter 22 is a basic "up" counter with a range equal to one-half the X dimension of the output memory. X address counter 22 is used to generate the X output address values and is clocked (CLK) and cleared (CLR) by control sequencer 18.

Output memory/X address multiplexer 24 simplifies the generation of the X output address by using the compliment (via an inverter 25) of the value of X address counter 22 to access the left half of display memory 12. The select control bit combined with the direct counter value is used to access the right half of the memory.

Output memory/Y address counter 26 is a basic counter with a range equal to the Y dimension of the output memory. It is used to generate the Y output address values and is clocked (CLK) and cleared (CLR) by control sequencer 18.

Reciprocal PROM 28 is a non-volatile memory device and is used to store pre-calculated values of the reciprocal function. When combined with multipliers such as 30 and 32 as illustrated, a divide function is realized.

The value of the Y source memory address is generated by differencing the Ky/Yoa value generated by multiplier 32 and constant Ys (via subtractor 38) which defines the Y dimension of source (PPI) memory 14.

Source memory X address multiplexer 40 simplifies the generation of the X source address by selecting one of two values. One value is the sum of the Kxl value and the constant Xs/2 taken via adder 34. These represent source pixel selections from the right side of source (PPI) memory 14 and are coincident with mapping to the right side of the output memory. The other value is the difference of those same quantities via subtractor 36 and is similarly used to access the left side of the source memory.

It will now be discerned that an arrangement is provided for converting a conventional plan position indicator radar display to a correctly scaled perspective display based on aircraft altitude, physical display dimensions and the viewing distance to the display screen. The conversion occurs between two cartesian based display memories, i.e. the PPI memory and the display memory. The PPI memory contains the plan position indicator image to be converted and the display memory contains the converted image ready for direct display on a bit map display device. A source pixel address is determined for each pixel in the target memory array. This reversed process allows the target memory to completely fill with the most appropriate pixel values at the frame rate with no other filling or erasing operation being required, as will be recognized as advantageous.

The invention has been described with relation to an altitude input to host processor 2 as from an air frame. The invention can be used as well with a ship-board radar system, and in which event the input to the host processor is the height of the radar antenna above the water line, or any reasonable value for providing a display at that altitude. In this regard, it will be understood that the higher the altitude the more PPI-like the display becomes.

Unless otherwise described the components of the invention are conventional in nature, with the novelty of the invention going to the arrangement of the components and not to said components themselves.

With the above description of the invention in mind, reference is made to the claims appended hereto for a definition of the scope of the invention.

What is claimed is:

1. An arrangement for converting a plan position indicator radar display to a scaled perspective display, comprising:

first memory means for storing plan position indicator image data;

second memory means;

converting means connected to the first memory means and to the second memory means for converting the stored plan position indicator image data to perspective display image data, and for transferring the perspective display image data to the second memory means, whereby said perspective display image data is stored in the second memory means ready for direct display on a bit-mapped display means; and means for addressing the first memory means for each pixel of the data stored in the second memory means, whereby the second memory means is completely filled with the most appropriate pixel values at a frame rate for eliminating further pixel filling and erasing.

2. An arrangement as described by claim 1, including:

a radar system;

the first memory means connected to the radar system for being addressed to receive plan position indicator image data therefrom;

first read/write arbitration logic means connected to the radar system and to the converting means for providing a first logic signal; and the first memory means connected to the first logic means and to the converting means and addressed by the converting means for receiving the first logic signal and for applying the stored plan position indicator data to said converting means.

3. An arrangement as described by claim 2, including:

host processing means responsive to the altitude of the radar system and to known bit-mapped display means constants for providing scaling and registering signals; and the converting means connected to the host processor and responsive to the scaling and registering signals for converting the plan position indicator data applied thereto to perspective display image data.

4. An arrangement as described by claim 3, wherein the bit-mapped display means includes:
   a display controller for providing control signals; and
   a display device connected to the display controller and controlled by the control signals for displaying the perspective display image data as a correctly scaled and registered image in real time.

5. An arrangement as described by claim 4, including:
   second read/write arbitration logic means connected to the display controller and to the converting means and controlled by said controller and said converting means for providing a second logic signal; and
   the second memory means connected to the second logic means and responsive to the second logic signal for being addressed by the converting means to receive the perspective display image data applied thereto by said converting means.

6. An arrangement as described by claim 5, including:
   the second memory means connected to the display controller and being addressed thereby for applying the perspective image data to said display controller.

7. An arrangement as described by claim 6, wherein:
   the display controller is connected to the converting means for clocking and synchronizing said converter means for addressing the second memory means and for applying the display image data thereto.

8. A method for converting a plan position indicator radar display to a scaled perspective display, comprising:
   storing plan position indicator image data;
   converting the stored plan position indicator image data to perspective display image data;
   storing the perspective display image data;
   directly displaying the perspective display image data on a bit-mapped display means; and
   addressing the stored plan position indicator image data for each pixel of the stored perspective display image data for filling said stored plan position indicator image data with the most appropriate pixel values at a frame rate for eliminating further pixel filling and erasing.

9. A method as described by claim 8, including:
   using a radar system for addressing storing the plan position indicator image data;
   using the radar system for generating a logic signal; and
   using the logic signal for converting the stored plan position indicator image data to the perspective display image data.

10. A method as described by claim 9, including:
    responding to the altitude of the radar system and to known bit-mapped display means constants for providing scaling and registering signals; and
    using the scaling and registering signals for converting the plan position indicator image data applied thereto to the perspective display image data.

11. A method as described by claim 10, including:
    providing control signals; and
    using the control signals to control a display device for displaying the perspective display image data as a correctly scaled and registered image in real time.

12. A method as described by claim 11, including:
    using the control signal to provide an other logic signal; and
    using the other logic signal for addressing a perspective display image data storage means for receiving and storing the perspective display image data.

13. A method as described by claim 12, including:
    using the control signals for addressing the display device for applying the perspective image data signals to the display device.

14. A method as described by claim 13, including:
    clocking and synchronizing the conversion of the stored plan position indicator image data to the perspective display image data and the addressing of the display device.

* * * * *